L. A. BABCOCK.
CUTTING DEVICE FOR FRUIT DISINTEGRATING MACHINES.
APPLICATION FILED AUG. 20, 1919.
1,373,398.
Patented Apr. 5, 1921.
3 SHEETS—SHEET 1.
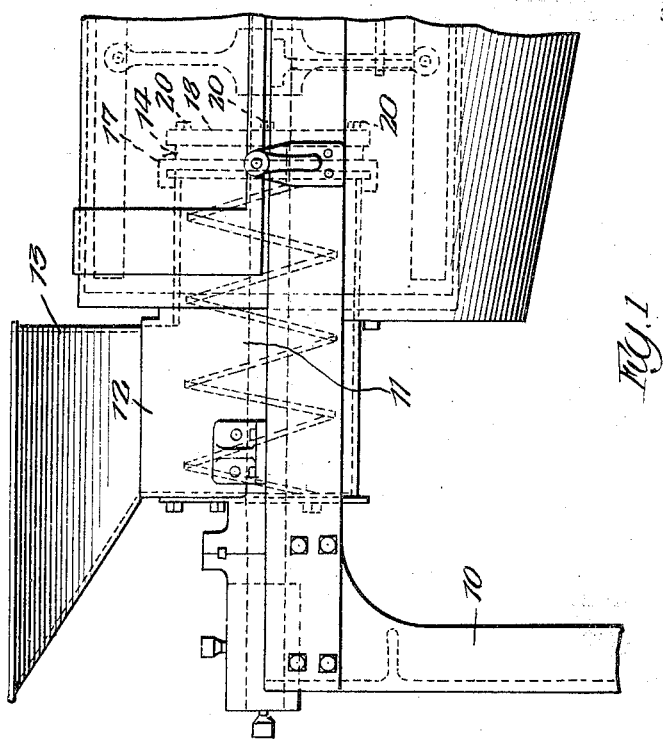
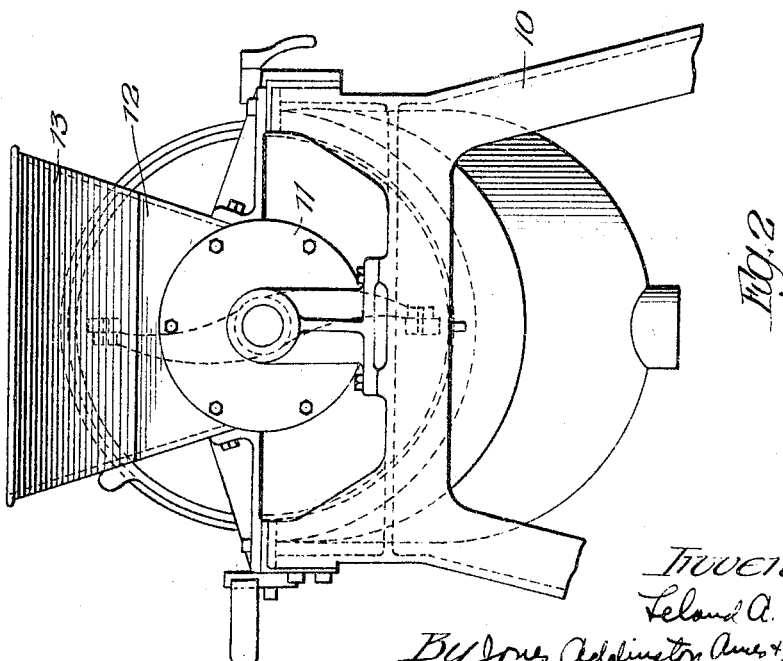

L. A. BABCOCK.
CUTTING DEVICE FOR FRUIT DISINTEGRATING MACHINES.
APPLICATION FILED AUG. 20, 1919.
1,373,398.
Patented Apr. 5, 1921.
3 SHEETS—SHEET 2.
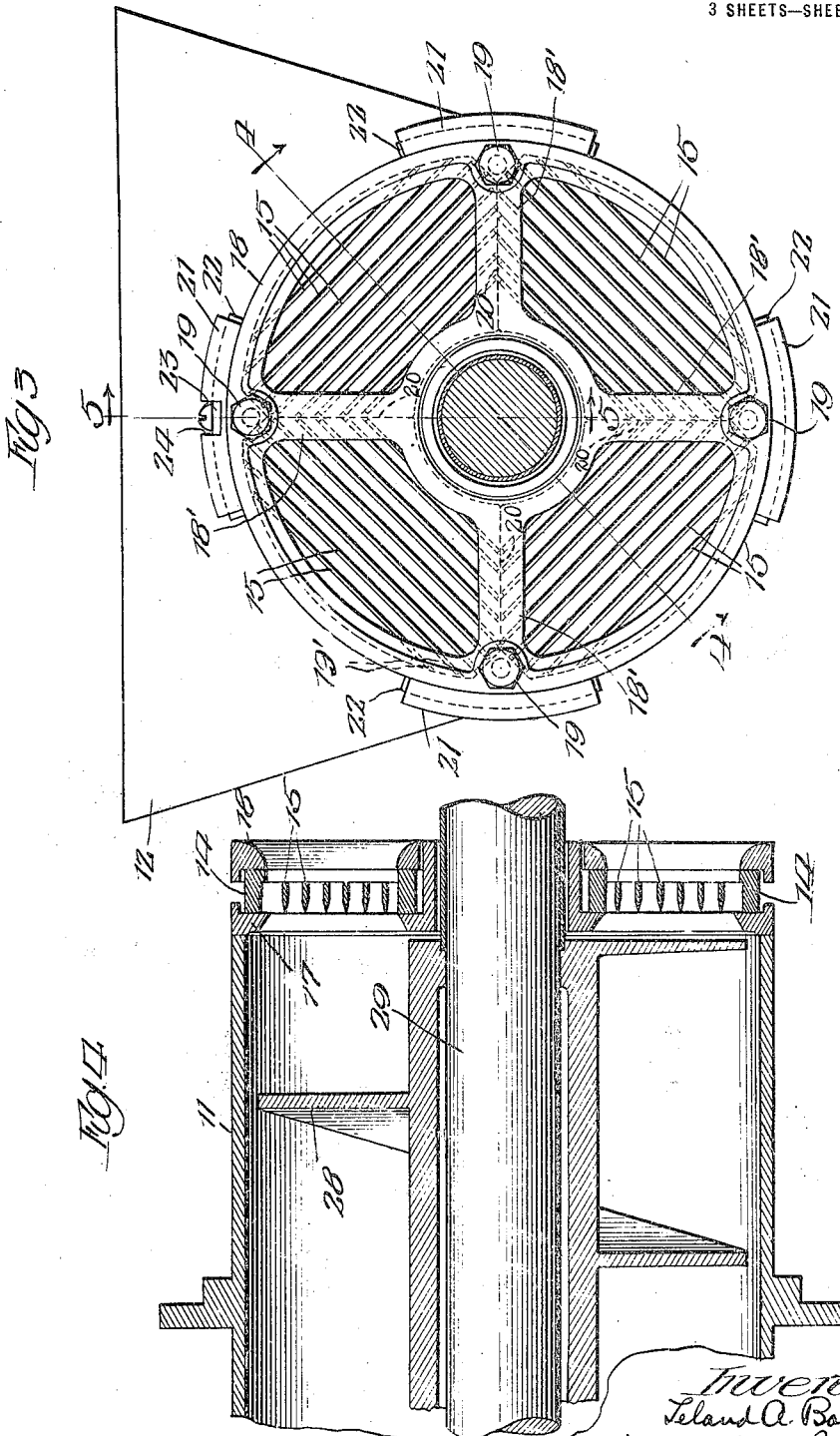

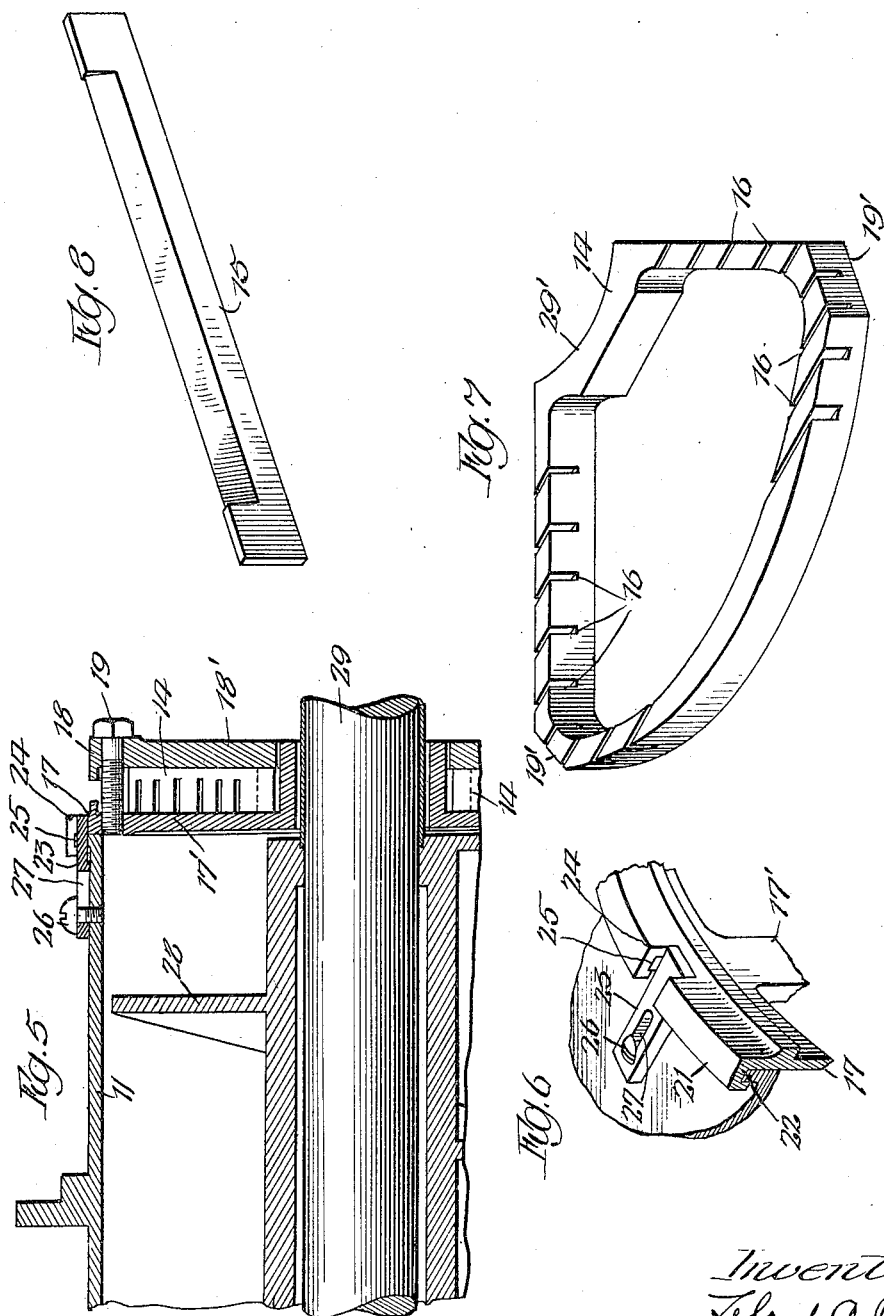

UNITED STATES PATENT OFFICE.

LELAND A. BABCOCK, OF CHICAGO, ILLINOIS, ASSIGNOR TO SPRAGUE CANNING MACHINERY COMPANY, OF CHICAGO, ILLINOIS, A CORPORATION OF ILLINOIS.

CUTTING DEVICE FOR FRUIT-DISINTEGRATING MACHINES.

1,373,398. Specification of Letters Patent. Patented Apr. 5, 1921.

Application filed August 20, 1919. Serial No. 318,640.

*To all whom it may concern:*

Be it known that I, LELAND A. BABCOCK, a citizen of the United States, residing at Chicago, in the county of Cook and State of Illinois, have invented new and useful Improvements in Cutting Devices for Fruit-Disintegrating Machines, of which the following is a full, clear, concise, and exact description, reference being had to the accompanying drawing, forming a part of this specification.

My invention relates to improvements in cutting devices for fruit disintegrating machines, and has for its object the production of a cutting device of this character which will be of maximum capacity and which will be of durable and economical construction.

A further object is the production of a cutting device as mentioned which will be made up of readily disconnected elements or parts permitting of the device being readily taken apart for cleaning purposes and for repairing or renewing disabled or worn parts.

Other objects will appear hereinafter.

With these objects in view the invention consists in the novel combinations and arrangements of parts to be hereinafter described and particularly pointed out in the appended claims.

A more clear understanding of the invention may be gained by reference to the accompanying drawings forming a part of this specification, and in which—

Figure 1 is a side elevation of one end of a fruit disintegrating machine equipped with mechanism embodying the invention;

Fig. 2 is an end elevation of the structure seen in Fig. 1;

Fig. 3 is a sectional view looking at the outer side of the cutting device;

Fig. 4 is a section taken on substantially line 4—4 of Fig. 3;

Fig. 5 is a section taken on substantially line 5—5 of Fig. 3;

Fig. 6 is a fragmentary perspective view illustrating the method of locking the cutting device in operative position;

Fig. 7 is a perspective view of one of the sections of the cutting element, the knives thereof being removed; and Fig. 8 is a perspective view of one of the knives.

The preferred form of construction, as illustrated in the drawings, comprises a suitable base 10 in which is rigidly secured a horizontally disposed housing 11, of substantially cylindrical form, said housing being provided at one end with an upwardly opening inlet 12 with which communicates an inlet hopper 13.

The opposite end of housing 11 is open, and arranged thereover is a cutter head comprising a plurality of sections 14, each of sector shape, said sections 14 being arranged in circular formation with the radial edges thereof contiguously disposed. Each of said sections is formed of a sector-formed frame or body, as seen in Fig. 7, in which is mounted a series of spaced parallel knives 15, the ends of said knives being mounted in spaced slots 16 provided for the reception thereof in one side of the frame. The ends of said knives snugly fit the slots 16 being held in position therein through friction.

The cutter sections 14 are clamped between holders 17 and 18 in the form of circular grids having openings of the same form as and registering with the openings in said cutter elements 14. Said members 17 and 18 are connected together and pressed into clamping relation with the sections 14 by means of bolts 19, which pass loosely through the member 18 and which are threaded into the member 17 as clearly seen in Fig. 5. It is, of course, apparent that the members 17 and 18 serve to positively lock the knives 15 in position in slots 16 when the parts are assembled.

The arrangement is such, as will be seen, that the cutter sections will be securely held in position, but in such a manner as to permit of ready removal or detachment thereof by simply removing bolts 19 in order to release the member 18. For the accommodation of bolts 19, the cutter sections 14 are beveled or cut away at 19', as clearly seen in Figs. 3 and 7.

In assembling the cutter sections between the holding members 17 and 18, the former are so arranged that the joints 20 between the contiguous radial edge portions thereof are positioned directly under the radial rods or bars 17' or 18' respectively of the members 17 and 18, said joints being thus effectually closed and a cutter element produced which apparently is of firm and rigid construction.

The frame or body portions of the cutter elements are of comparatively light weight, leaving comparatively large openings registering with the openings in the members 17 and 18 with the result that the aggregate passage through the cutter head for the material to be acted upon will be of maximum size thus resulting in a machine of maximum capacity when in operation.

The cutter head is detachably connected with the housing 11 through the medium of a bayonet-joint connection comprising spaced interlocking flanges 21 and 22 formed respectively upon the member 17 of the cutter head and said housing. The arrangement is such that detachment of the cutter head may be effected by simply rotating the same to a position in which the flanges 21 are positioned out of registration with the flanges 22, in which event the cutter head will be free, permitting of removal thereof from the housing. Said flanges 21 and 22 are locked in interlocking relation by means of a key or finger 23 which is adapted to engage with registering notches 24 and 25 provided respectively in the flanges 21 and 22 at the upper side of the housing, as clearly seen in Figs. 5 and 6. Said key is shiftably secured to the housing by means of a screw 26 which engages with an elongated slot 27 provided in said key, said slot being of such length as to permit of the key being slid rearwardly to disengage notches 24 and 25 when it is desired to remove the cutter head.

The material to be acted upon is fed longitudinally through the housing and forced through the cutter head by means of a worm 28 which is carried by a shaft 29 extending axially of said housing and which is mounted in suitable bearings provided therefor in base 10. The members 17 and 18 of the cutter head are, of course, formed to accommodate the shaft 29 and the inner edges of the elements 14 or cutter head are concavely formed or cut away as at 29' for the same reason.

In the operation of the machine, the material to be acted upon is introduced into the hopper 13 whence the same passes through the inlet opening 12 into the housing 11. At this point the same is engaged by the worm 28 and carried thereby through the housing and forced through the stationary cutter head as just pointed out. In passing through the cutter head the material is engaged by the knives 15 and cut or divided thereby into small pieces which are further acted upon as the material progresses toward the discharge end of the machine.

By reason of the peculiar construction of the cutter head resulting in the production of a plurality of knife-traversed openings, the aggregate of which is very large, a machine is produced having a maximum capacity. The machine is especially adapted for use in connection with tomatoes, pumpkins, squash, sweet potatoes, apples, prunes, figs, oranges, grape fruit and other material of like character.

The arrangement is of simple construction, being capable of economical manufacture, while at the same time the association of the component parts is such as to permit of ready disassembling for purposes of cleaning, repair or renewal.

Although, in this specification I have illustrated and described one form of my invention, it is understood that changes and modifications might be made in the construction which will be within the spirit of my invention as defined by the claims hereunto appended.

Having thus described my invention, what I claim as new and desire to secure by Letters Patent is:

1. A cutting device of the class described comprising a sectional stationary cutting element, each section of said cutting element comprising a frame and a plurality of spaced knives; and means for forcing the material to be cut through said cutting element.

2. A cutting device of the class described comprising a cutting element made up of a plurality of sections arranged edge to edge and held in fixed relation with each other, each of said sections comprising a frame and a plurality of spaced knives; and means for forcing the material to be cut through said cutting element.

3. A cutting device of the class described comprising a cutting element made up of a plurality of sections, said sections being of sector shape and being arranged in circular formation with their radially disposed edges arranged adjacent each other; and means for forcing the material to be cut through said cutting element.

4. A cutting device of the class described comprising a cutting element made up of a plurality of sections each of sector shape; and means for forcing the material to be cut through said cutting element.

5. A cutting device of the class described comprising a housing; a stationary sectional cutting element arranged at one end of said housing, each section of said cutting element comprising a frame and a plurality of spaced knives; and means for forcing the material to be cut through said housing and toward said cutting element.

6. A cutting device of the class described comprising a cutting element made up of a plurality of separate sections; each of said sections comprising a frame and a plurality of spaced knives; and means for clamping said sections together and holding the same stationary.

7. A cutting device of the class described comprising a cutting element made up of a plurality of separate sections, each formed of a frame and a plurality of spaced knives; and a pair of holding members between which said sections are clamped.

8. A cutting device of the class described comprising a cutting element made up of a plurality of separate sections; a pair of holding members between which said sections are clamped, said members having registering openings therein, and said sections being arranged in alinement with said openings.

9. A cutting device of the class described comprising a cutting element made up of a plurality of sector-shaped sections; a pair of holding members between which said sections are clamped, said members having registering sector-shaped openings therein, and said sections being arranged in alinement with said openings.

10. A cutting device of the class described comprising a cutting element made up of a plurality of sections, said sections being of sector-shape and being arranged in circular formation with their radially disposed edges arranged adjacent each other; a grid carrying said sections, said grid having sector-shaped openings registering with said sections; and means for fastening said sections to said grid.

11. A cutting device of the class described comprising a cutting element made up of a plurality of sections, said sections being of sector-shape and being arranged in circular formation with their radially disposed edges arranged adjacent each other; a grid carrying said sections, said grid having sector-shaped openings registering with said sections; and means for fastening said sections to said grid, said grid and fastening means being adapted to cover the joints between adjacent sections.

12. A cutting device of the class described comprising a cutting element made up of a plurality of sections, said sections being of sector-shape and being arranged in circular formation with their radially disposed edges arranged adjacent each other; a grid carrying said sections, said grid having sector-shaped openings registering with said sections; and means for fastening said sections to said grid; a housing through which the material to be cut is adapted to be fed to said cutting element; and means for detachably fastening said grid to said housing.

13. A cutting device of the class described comprising a cutting element made up of a plurality of sections, each of said sections comprising a frame of sector shape; and a plurality of spaced knives mounted in said frame.

In witness whereof, I have hereunto subscribed my name.

LELAND A. BABCOCK.